Sept. 1, 1953 J. R. ACTON 2,651,004

ELECTRONIC COUNTING AND/OR SELECTING ARRANGEMENT

Filed June 20, 1951 5 Sheets-Sheet 1

FIG. I.

Inventor
John Reginald Acton
By [signature]

Inventor
John Reginald Acton
By [signature]

Sept. 1, 1953 J. R. ACTON 2,651,004

ELECTRONIC COUNTING AND/OR SELECTING ARRANGEMENT

Filed June 20, 1951 5 Sheets-Sheet 3

Inventor
John Reginald Acton

By [signature] Agt

Sept. 1, 1953 J. R. ACTON 2,651,004

ELECTRONIC COUNTING AND/OR SELECTING ARRANGEMENT

Filed June 20, 1951 5 Sheets-Sheet 4

Inventor
John Reginald Acton

By [signature]

Sept. 1, 1953 J. R. ACTON 2,651,004

ELECTRONIC COUNTING AND/OR SELECTING ARRANGEMENT

Filed June 20, 1951 5 Sheets-Sheet 5

Inventor
John Reginald Acton
By [signature] att

Patented Sept. 1, 1953 | 2,651,004

UNITED STATES PATENT OFFICE 2,651,004

ELECTRONIC COUNTING AND/OR SELECTING ARRANGEMENT

John Reginald Acton, Bunny, England, assignor to Ericsson Telephones Limited, London, England Application June 20, 1951, Serial No. 232,571
In Great Britain June 22, 1950

12 Claims. (Cl. 315—169)

Figure 1:
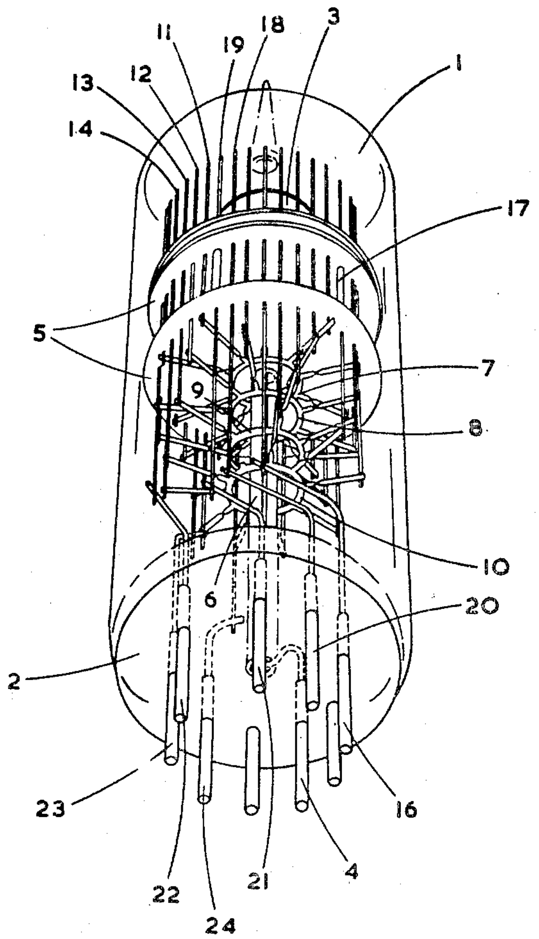

My invention relates to electronic counting and/or selecting arrangements, and particularly to such arrangements employing one or more gaseous electric discharge tubes.

In some known electronic counting, integrating, or selecting arrangements, each incoming pulse of electric current is adapted to guide the discharge path or glow in an electric discharge tube between successive signal or transit electrodes by way of two intermediate guide electrodes. In some of these arrangements the direct-current pulses which are adapted to guide the discharge path between the said signal electrodes, have to be modified in such a manner that each such pulse provides two or more pulses of differing potential at different times. In other arrangements pulses of two phase or three phase alternating current may be employed to produce the required guiding effect. With many such arrangements the characteristic of any particular circuit network is effective when the incoming pulses are of a particular wave form and/or frequency, and is ineffective when the said incoming pulses depart appreciably from the said wave form and/or frequency.

It is one object of my invention to provide new and improved counting and/or selecting arrangements.

It is another object of my invention to provide an improved gaseous electric discharge tube for use in counting and/or selecting arrangements.

In one form of my invention I provide arrangements in which a gaseous electric discharge tube is provided with an anode common to four cathodes each with a similar plurality of discharge points. The said cathode discharge points are so disposed with regard to the common anode that they provide a plurality of discharge paths of substantially similar characteristics between the anode and the said cathodes. The discharge points of each of the cathodes are arranged individually in regular rotation with the discharge points of each of the other cathodes and in such a manner that when suitable potentials are applied to the anode, and in turn to each of the cathodes, a discharge glow is caused to invest a discharge point of each of the cathodes in a regular predetermined sequence. The discharge points of one cathode in such a tube may be connected to a common member within the tube, or connected together by means of a circuit network external to the tube.

In another form of my invention I provide arrangements in which a gaseous electric discharge tube is provided with an anode common to five, six or more cathodes; three or more of the said cathodes are each provided with a plurality of discharge points and the other cathodes each have an individual discharge point. Each of the said discharge points provides a separate discharge path of substantially similar characteristics to the common anode. The discharge points or point of each of the said cathodes are arranged individually in rotation with the discharge points of the other cathodes in such a manner that when suitable potentials are applied to the anode, and in a regular order to the cathodes, a discharge glow is caused to invest each of the said discharge points in a regular predetermined sequence. In such an arrangement an output pulse may be derived from one or more of the cathodes provided with a single discharge point.

According to my invention I provide a gaseous electric discharge device in which a plurality of discharge gaps of like characteristics between the discharge surface of a common electrode and four electrodes each with a similar plurality of discharge points are so arranged that a discharge path between a discharge point of one electrode and the common electrode is caused to move to another discharge point of the same electrode by way of a discharge point of each of the other three electrodes in succession in response to a single electrical impulse. Again according to my invention I provide a gaseous electric discharge device in which a plurality of discharge gaps of like characteristics between the discharge surface of a common electrode and five or more electrodes each with at least one discharge point are so arranged that a discharge path between a discharge point of one electrode and the common electrode is caused to move to another discharge point of the same electrode or to a discharge point of another electrode by way of a discharge point of each of three other electrodes in succession in response to a single electrical impulse.

Further, according to my invention, a gaseous electric discharge device adapted to count in response to electrical impulses in which the discharge surface of a common electrode is arranged substantially equidistantly from a plurality of discharge points of four or more other electrodes to form a plurality of discharge gaps of like characteristics, is characterised in this, that the said discharge points are so ordered and disposed that a discharge path between the common electrode and a discharge point of another electrode is caused to move from one discharge point to another discharge point by way of three intervening discharge points in a regular predetermined order in response to each electrical impulse. Again according to my invention a gaseous electric discharge device adapted to count or select in response to electrical impulses in which the discharge surface of a common electrode is arranged substantially equidistantly from a single discharge point of each of a plurality of electrodes and a plurality of discharge points of three other electrodes to form a plurality of discharge gaps of like characteristics, is characterised in this, that the said discharge points are so ordered and disposed that a discharge path between the common electrode and a single-point electrode is caused to move to an adjacent single point electrode by way of a discharge point of each of the three multi-point electrodes in a regular predetermined order in response to each electrical impulse.

In further aspects of my invention I provide arrangements, including resistive or reactive means, for counting electrical impulses, and for selecting any one of a plurality of lines in response to electrical impulses.

Figure 2:
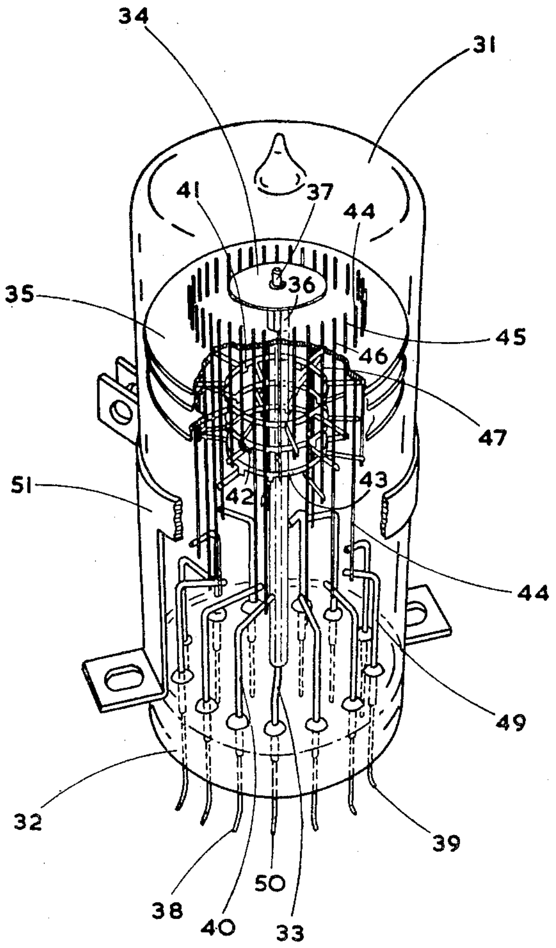
Figure 3:
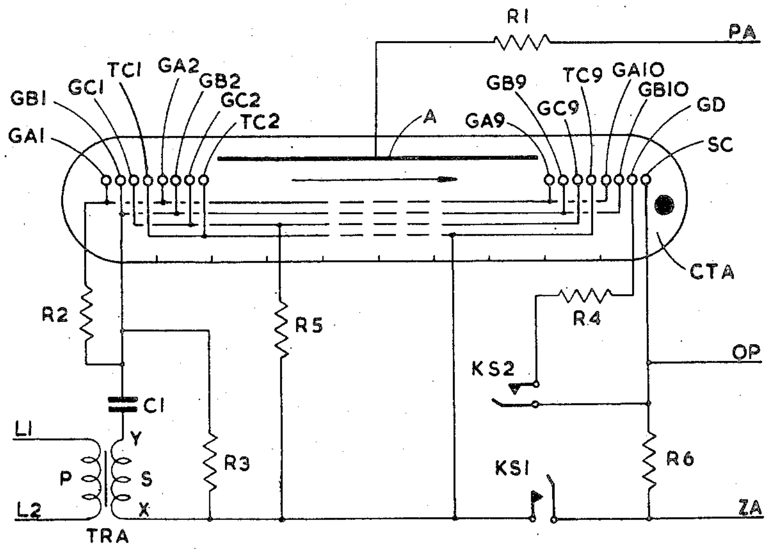
Figure 4:
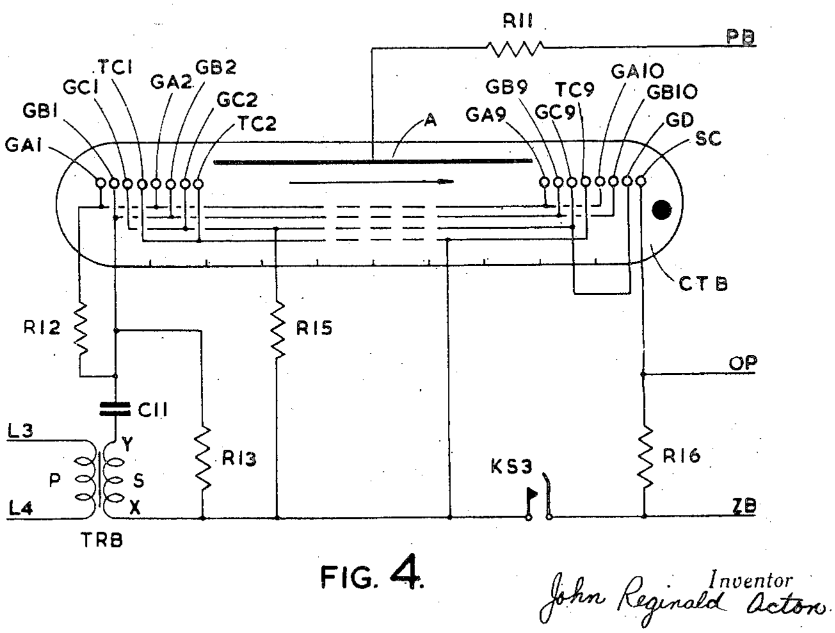
Figure 5:
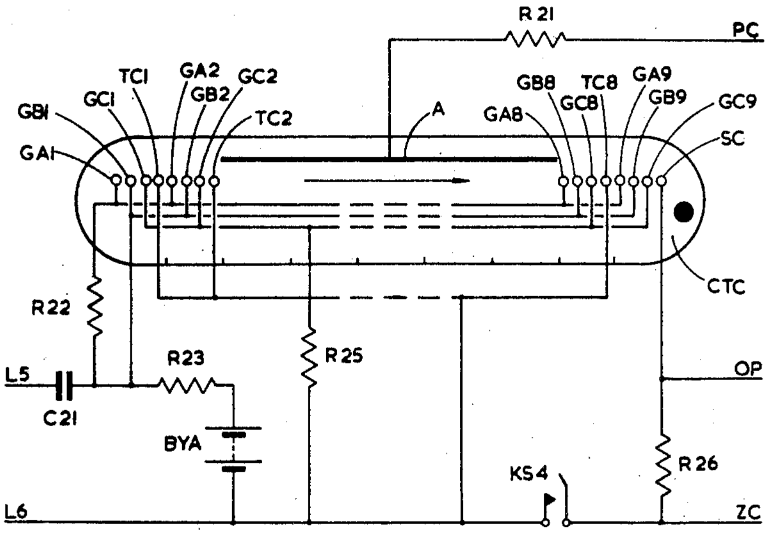
Figure 6:
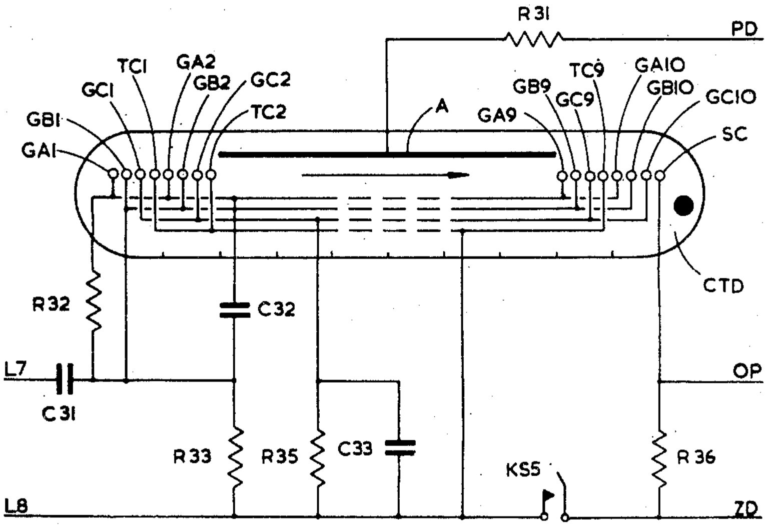
Figure 7:
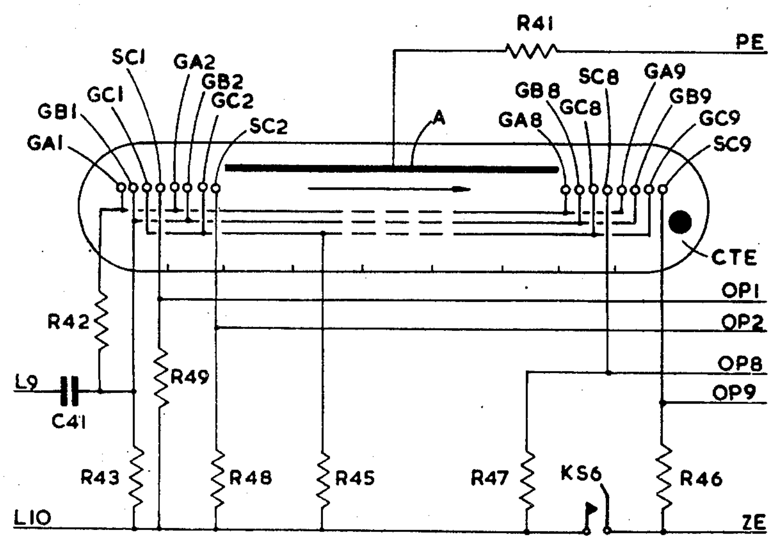
Figure 8:
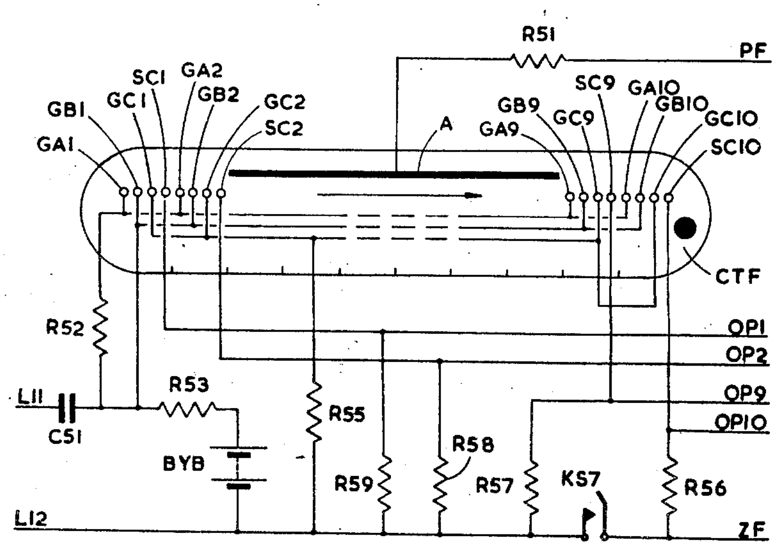

The invention will be better understood from the following description and reference should now be made to the accompanying drawings in which Fig. 1 shows an electron discharge device in the form of a cold-cathode discharge tube suitable for counting or dividing in the scale of ten, and Fig. 2 shows a similar device in the form of a cold-cathode discharge tube suitable for counting or dividing in the scale of nine, or of selecting any one of nine outlets. Fig. 3 shows a circuit arrangement adapted to count cycles of alternating current in the scale of ten, Fig. 4 shows another arrangement for counting cycles of alternating current in the scale of ten, and Fig. 5 shows a circuit arrangement employing a bias battery and adapted to count in the scale of nine. The arrangement shown in Fig. 6 is a reactive circuit adapted to count in the scale of ten, Fig. 7 shows a nine outlet selecting arrangement, and Fig. 8 shows a ten outlet selecting arrangement with a bias battery.

Fig. 1 shows one method of constructing a cold-cathode discharge tube embodying my invention, such a tube forms a scale of ten counting or dividing device when included in a suitable circuit arrangement. In this preferred form of counting tube we enclose within a glass bulb 1 attached to a circular glass base 2, three mica discs 5 spaced apart and facing each other, each disc 5 is pierced at the centre and has 40 holes pierced 7.5 millimetres therefrom on radii spaced at intervals of nine degrees. In a position six millimetres above the outer face of the top disc 5 I mount an anode 3 in the form of a nickel disc ten millimetres in diameter. Anode 3 is attached to the upper end of a nickel rod enclosed within a glass tube 6, and the lower end of the said nickel rod is welded to the internal lead-out wire of base-pin 4. Glass tube 6 is fitted firmly within and passes through, the central hole in each disc 5 and through the centre of cathode ring members 7, 8, 9, and 10. The electrodes 11, 12, 13, 14, 18, and 19 which form the cathode discharge points consist of 40 nickel rods 0.3 millimetre in diameter; each such electrode passes through a radially spaced hole in each disc 5, and is thereby maintained in such a position that the said plurality of discharge points are located equidistantly around a cylindrical surface coaxial with the anode 3. The upper end of each cathode electrode 11, 12, 13, 14, 18, and 19 projects some six millimetres beyond the outer face of top disc 5, and lies in a plane which is common to anode 3 and parallel to the face of the said discs 5. Insulating tubes 17 on selected cathode electrodes serve to maintain discs 5 in a predetermined position with regard to each other.

The 40 cathode electrodes consist of ten first guide electrodes 11 each connected at its lower end to a ring member 7 comon to all first guide electrodes 11, ten second guide electrodes 12 each connected to a ring member 8 common to all second guide electrodes 12, a third group of ten electrodes which consists of nine third guide electrodes 13 connected to ring member 9 and a separately connected electrode which forms the signal-guide electrode 18, and a fourth group of ten electrodes which consists of nine transit electrodes 14 connected to a common ring member 10 and a separately connected electrode which forms the signal electrode 19. Ring members 7, 8, 9, and 10 are formed from nickel sheet of suitable thickness, and each is provided with ten equally spaced radial arms, one arm is removed when the ring is connected to nine electrodes. The signal-guide electrode 18 and the signal electrode 19 are each welded directly to the lead-out wire of an associated base pin 20 and 21 respectively. The commoned first-guide, second-guide, third-guide and transit electrodes 11, 12, 13, and 14 respectively are connected to the lead-out wire of an associated base-pin 16, 22, 23, and 24 respectively.

When viewed from the top of bulb 1 the clockwise sequence of the electrodes which form the discharge points around anode 3 is such that a first-guide electrode 11 is followed by a second-guide electrode 12, a third-guide electrode 13 and a transit electrode 14 in that order, and the signal-guide electrode 18 and signal electrode 19 follow a second-guide electrode 12 in that order.

The characteristics of a cold-cathode discharge tube having an electrode assembly of the described form and dimensions, when it is filled with a gaseous mixture consisting substantially of 92.1% neon, 7.0% hydrogen, and 0.9% argon to a pressure equivalent to some 80 millimetres of mercury, are such that a discharge glow or path is established between the anode and a cathode electrode when the potential difference between the said electrodes is of the order of 200 volts, and the glow is guided from one cathode electrode to an adjoining cathode electrode when the potential on the said adjoining cathode electrode becomes substantially 15 volts more negative than the electrode invested by the glow.

The cold cathode discharge tube depicted in Fig. 2 will form a scale of nine counting or dividing device, or a nine outlet selecting device when included in a suitable counting or selecting arrangement. In the preferred form of tube shown in perspective in Fig. 2 a portion of the three spacing discs 35 has been deleted to clarify the illustration, and for a similar reason a portion of a suitable mounting clip 51 for such a tube has been removed.

In the method of constructing the cold-cathode discharge tube shown in Fig. 2 I enclose within a glass bulb 31, attached at its lower end to a circular glass base 32, three mica discs 35 spaced apart and facing each other. Each disc 35 is pierced at the centre, and has 36 holes pierced 10 millimetres therefrom on radii spaced at intervals of ten degrees. In a position six millimetres above the outer face of top disc 35 I mount an anode 34 in the form of a nickel disc ten millimetres in diameter. Anode 34 is attached to the upper end of a nickel rod 37 the greater part of which is enclosed within a glass tube 36. The lower end of rod 37 is welded to the internal lead-out wire 33 of a base pin 50. Glass tube 36 is fitted firmly within and passes through the central hole in each disc 35 and through the centre of each cathode ring member 41, 42, and 43.

The electrodes 44, 45, 46, and 47 which form the cathode discharge points consist of 36 nickel rods 0.4 millimetre in diameter; each such rod passes through a radially spaced hole in each disc 35, and is thereby maintained in such a position that the said plurality of discharge points are located equidistantly around a cylindrical surface coaxial with the anode 34. The upper end of each cathode electrode 44, 45, 46, and 47 projects some six millimetres beyond the outer face of top disc 35, and lies in a plane which is common to anode 34 and parallel to the face of discs 35.

The 36 cathode electrodes consist of nine first-guide electrodes 45, nine second-guide electrodes 46, nine third-guide electrodes 47 and nine signal/transit electrodes 44. The first-guide electrodes 45 are welded to a ring member 41, second-guide electrodes 46 are welded to ring member 42, and third-guide electrodes 47 are welded to ring member 43. Ring members 41, 42, and 43 are formed from nickel sheet and have nine equally spaced radial arms projecting outwards therefrom. Each signal/transit electrode 44 is connected directly to the internal lead-out wire 49 of an associated base pin 39. The first-guide, second-guide, and third-guide electrodes 45, 46, and 47 respectively are connected by way of ring members 41, 42, and 43 to the lead-out wire of a base-pin associated with a particular group of guide electrodes. The connections of third-guide electrodes 47 and ring-member 43 to lead-out wire 40 of base pin 38 are shown as a typical example.

When viewed from the top of bulb 31 the clockwise sequence of the electrodes which form the discharge points around anode 34 is such that a first-guide electrode 45 is followed by a second-guide electrode 46, a third-guide electrode 47, and a signal/transit electrode 44 in that order.

The characteristics of a cold-cathode discharge tube having an electrode assembly of the described form and dimensions, when it is filled with a gaseous mixture consisting substantially of 92.1% neon, 7.0% hydrogen, and 0.9% argon to a pressure equivalent to some 50 millimetres of mercury are such that a discharge glow or path is established between the anode and a cathode electrode when the potential difference between the said electrodes is of the order of 200 volts, and the glow is guided from one cathode electrode to an adjoining cathode electrode when the potential on the said adjoining electrode becomes substantially 15 volts more negative than the electrode invested by the glow.

A particular arrangement embodying my invention and adapted to count or divide in the scale of ten will now be described with reference to Fig. 3. For the sake of brevity the various electrodes will be designated by alphabetical and numerical symbols introduced in the first place in brackets, and thereafter used in place of a complete verbal description. In this arrangement a gaseous electric discharge tube CTA, similar to that described with reference to Fig. 1, has in addition to a common anode (A), two cathodes (GA and GB) each with ten electrodes (GA1–GA10 and GB1–GB10), two cathodes (TC and GC) each with nine electrodes (TC1–TC9 and GC1–GC9), and two single electrode cathodes (SC and GD). The cathode electrodes are arranged around the common anode A in the order shown in the graphical symbol of tube CTA. In the symbol depicting the multi-cathode tube CTA the direction of the movement of the discharge glow is indicated by a conventional arrow, and for the convenience of draughting the groups of electrodes GA3, GB3, GC3, TC3, to GA8, GB8, GC8, TC8 inclusive, which are situated in that order between electrodes TC2 and GA9, have been omitted. In such a tube the individual cathode electrodes are arranged equidistantly from anode A, and electrode SC adjoins electrode GA1.

Leads PA and ZA are connected to the positive and negative poles of a suitable source of direct current from whence a potential of the order of 500 volts is derived. The positive potential at lead PA is applied by way of a 470,000 ohm resistor R1 to anode A. The negative potential at lead ZA is applied by way of a 330,000 ohm resistor R6 to electrode SC which I will term the signal cathode, thence by way of a 150,000 ohm resistor R4 to electrode GD which I will term the signal guide cathode. Cathode GC which I will term the third-guide cathode is also connected to lead ZA by way of a 470,000 ohm resistor R5. Cathode TC which I will term the transit cathode, and one end (X) of the secondary winding S of a 1:1 transformer TRA, is each connected directly to lead ZA. Cathodes GA and GB, which I will term the first and second-guide cathodes respectively, are connected by way of a 0.1 microfarad capacitor C1 to end (Y) of the secondary winding S of transformer TRA, the connection from the first-guide cathode GA being made by way of 100,000 ohm resistor R2. Resistor R3 arranged in parallel with secondary winding S has a resistance of 47,000 ohms. The primary winding P of transformer TRA is connected by way of leads L1 and L2 to a source of alternating current with a root-mean-square value of the order of 50 volts.

With leads PA and ZA connected to the described suitable source of direct current a discharge glow is caused to invest cathode SC, and current passes between anode A and the said cathode SC. The circuit is quiescent, and the discharge glow remains halted on signal cathode SC until the start key is operated, and contacts KS1 and KS2 are closed. When contacts KS1 and KS2 are closed the negative potential at lead ZA is applied to each of the other cathode electrodes in the tube CTA by way of their associated resistor network R2, R3, R4, and R5. With primary winding P of transformer TRA connected to a suitable source of alternating current the potential at end Y of secondary winding S will eventually become more negative than the potential applied to signal cathode SC, and at the same time the potentials at guide cathodes GA and GB will each become more negative than the potential at signal cathode SC.

It is a characteristic feature of such cold-cathode discharge tubes that the discharge glow is caused to move from one cathode to another cathode when either a sufficiently more negative potential is applied to the latter cathode; or with a sufficiently negative potential on the latter cathode the potential applied to the former cathode is made less negative. It is also characteristic of such tubes in which the electrodes are suitably disposed and spaced, and the contents and pressure of the gaseous filling are also suitable, that the discharge glow will move to the nearest more negative cathode in preference to moving to a more distant cathode at a still more negative potential. Thus the discharge glow in the described tube CTA will move to and invest the adjoining first-guide electrode GA1 and will not be transferred to second-guide electrode GB10.

When the glow invests first-guide electrode GA1 the potential at guide cathode GA becomes less negative in consequence of the voltage which is developed across resistor R2 in series with the said guide cathode GA, and reaches a value where the potential difference between guide cathodes GA and GB is such that the discharge glow will move to and invest the adjoining more negative second-guide electrode GB1.

After the potential at the end Y of the secondary winding S of transformer TRA passes from a particular negative value to a more positive value the potential at first and second-guide cathodes GA and GB becomes less negative than the potential applied to third-guide cathode GC, and in consequence of the previously described characteristics of such tubes the discharge glow will move to and invest the adjoining third-guide electrode GC1 when the potential difference between guide cathodes GB and GC reaches the effective transfer value.

When the glow invests third-guide electrode GC1 the potential at guide cathode GC becomes less negative in consequence of the voltage which is developed across resistor R5 in series with the said guide cathode GC, and reaches a value where the potential difference between guide cathode GC and transit cathode TC is sufficient to cause the discharge glow to move to and invest transit electrode TC1.

The glow discharge remains captive on the said transit electrode TC1 until, on receipt of the next impulse, the potential at end Y of the transformer TRA secondary winding S, and the connected first and second-guide cathodes GA and GB, again become sufficiently negative to cause the glow discharge to move to and invest first-guide electrode GA2, thence to move to and invest second-guide electrode GB2. When on the succeeding half cycle of the impulse the potential at the end Y of the transformer secondary winding passes to a more positive value the potential at first and second-guide cathodes GA and GB again become less negative than the potential applied to third-guide cathode GC, and the glow discharge moves to and invests third-guide electrode GC2. The effect of resistor R5 in series with third-guide cathode GC again causes the potential thereat to become less negative, and the glow moves to and invests the adjoining transit electrode TC2.

Each subsequent impulse derived from the secondary winding S of transformer TRA causes the discharge glow to move in the manner described from one electrode of the transit cathode TC by way of an electrode of the first-guide, second-guide, and third-guide cathodes GA, GB, and GC respectively in that order, to the next electrode of the said transit cathode TC. The tenth impulse causes the discharge glow to move to the signal cathode SC by way of signal guide cathode GD, and the potential developed across resistor R6 in series with signal cathode SC is adapted to pass an output pulse by way of lead OP to a further counting stage, or to a known form of suitable recording device.

With the glow again investing signal cathode SC, subsequent impulses will cause the discharge glow to move to and invest each cathode electrode in turn in the manner described previously and to pass an output pulse to further means on receipt of each tenth impulse. Thus the tube will serve to count or divide pluralities of cycles of alternating current in the scale of ten. The incoming pulses of electric current need not be of similar duration or in any regular time formation. On receipt of each group of ten impulses the tube will pass a "tens" pulse in the manner described.

Another arrangement adapted to count or divide in the scale of ten will now be described with reference to Fig. 4. The gaseous electric discharge tube CTB in this arrangement is similar to that described with reference to Fig. 1, and is similar to tube CTA in the arrangement described with reference to Fig. 3. In the following description the designation of the electrodes forming the electrode assembly in tube CTB will be similar to the designation of the electrodes in tube CTA.

Leads PB and ZB are connected to the positive and negative poles respectively of a suitable source of direct current from whence a potential of the order of 500 volts is derived. The positive potential at lead PB is applied by way of a 560,000 ohm resistor R11 to anode A of tube CTB. The negative potential at lead ZB is applied by way of an 82,000 ohm resistor R16 to signal cathode SC and lead OP. The negative potential at lead ZB is also extended, on the operation of start key contacts KS3 directly to transit cathode TC, to third-guide and signal guide cathode GC and GD respectively by way of a 470,000 ohm resistor R15, and to resistor R13 and connection X of secondary winding S of transformer TRB. The connections of first-guide cathode GA and second-guide cathode GB to a network including resistors R12, and R13, capacitor C11, secondary winding S of transformer TRB and incoming pulse leads L3 and L4 are similar to the network connecting the first and second-guide cathodes in Fig. 3, and the characteristics and values of the said components are the same in each arrangement. Leads L3 and L4 are connected to a source of alternating current with a root-mean-square value of 50 volts.

With leads PA and ZA connected to the described source of direct current a discharge glow is caused to invest signal cathode SC and current passes between the said anode A and cathode SC. The discharge glow continues to invest signal cathode SC until the start key is operated and contacts KS3 are closed. With contacts KS3 closed the negative potential at lead ZB is applied to each other cathode electrode in tube CTB either directly or by way of an associated resistor R12, R13, or R15. With leads L3 and L4 connected to the described source of alternating current the potential at secondary winding S of transformer TRB will eventually become more negative than the potential applied to signal cathode SC, and at the same time guide cathodes GA and GB will each become more negative than the potential at signal cathode SC.

In consequence of the characteristic feature of such cold-cathode discharge tubes as described previously with reference to Fig. 3, the discharge path or glow will move from signal cathode SC and invest the adjoining first-guide electrode GA1 when the potential difference between signal cathode SC and the more negative first-guide electrode GA1 reaches the effective transfer value. With the discharge glow investing first-guide electrode GA1 the potential thereat becomes less negative in consequence of the voltage which is developed across resistor R12, and reaches a value where the potential difference between first and second-guide cathodes GA and GB is such that the discharge glow will move to and invest the adjoining more negative second-guide electrode GB1, at the same time first-guide cathode GA remains more negative than signal cathode SC.

When the potential at end Y of secondary winding S of transformer TRB passes from a particular negative value to a more positive value the potential at first and second-guide cathodes GA and GB becomes less negative than the potential applied to third-guide cathodes GC and GD, and in consequence of the previously described characteristics of such tubes the discharge glow will move to and invest the adjoining third-guide electrode GC1 when the potential difference between guide cathodes GB and GC reaches the effective transfer value. The potential at third-guide cathode GC becomes less negative in consequence of the voltage which is developed across resistor R15 when the discharge glow invests third-guide electrode GC1, and reaches a value where the potential difference between guide cathode GC and transit cathode TC is sufficient to cause the discharge glow to move to and invest transit electrode TC1.

The glow discharge remains captive on transit electrode TC1 until, on receipt of the negative half cycle of the next impulse, the potential at end Y of the transformer TRB secondary winding S, and the connected first and second-guide cathodes GA and GB, again becomes sufficiently negative to cause the discharge glow to move to and invest first-guide electrode GA2, thence to move to and invest second-guide electrode GB2. On the succeeding half-cycle of the impulse the potential at end Y of the secondary winding S passes to a more positive value, and the potential at first and second-guide cathodes GA and GB again becomes less negative than the potential applied to third-guide cathodes GC and GD, and the glow discharge moves to and invests third-guide electrode GC2. The effect of resistor R15 in series with third-guide cathode GC again causes the potential thereat to become less negative, and the glow moves to and invests the adjoining transit electrode TC2.

Each subsequent incoming impulse causes the discharge glow to move in the manner described from one electrode of the transit cathode TC by way of an electrode of the first-guide, second-guide, and third-guide cathodes GA, GB, and GC/GD respectively in that order to the next electrode of the said transit cathode TC. The tenth impulse causes the discharge glow to move to and invest signal cathode SC, and the potential developed across resistor R16 is adapted to pass an output pulse by way of lead OP to a further counting stage, or to a suitable form of recording device.

With the glow again investing signal cathode SC, subsequent impulses will cause the discharge glow to move to and invest each cathode electrode in turn in the manner described previously, and to pass an output pulse to further counting or registering means on receipt of each tenth impulse. Thus the described tube and circuit arrangement will serve to count or divide pluralities of incoming cycles of alternating current in the scale of ten.

The arrangement shown in Fig. 5 is adapted to count or divide in the scale of nine, and employs a bias battery to localise the discharge glow on an electrode of a particular cathode when the final impulse of any train of incoming pulses is not received in full. In such an arrangement a gaseous electric discharge tube CTC, similar to that described with reference to Fig. 2, has first, second and third-guide cathodes (GA, GB, and GC) each with nine electrodes GA1, GA2, . . . GA8, GA9; and GB1, GB2, . . . GB8, GB9, GC1, GC2, . . . GC8, GC9 respectively, a transit cathode (TC) with eight electrodes TC1, TC2, . . . TC8, and a single electrode signal cathode SC. The electrodes of the transit cathode TC are taken out separately from the bulb, and commoned by external means; the electrodes of the other multi-electrode cathodes GA, GB, and GC are commoned internally.

Leads PC and ZC are connected to the positive and negative poles respectively of a suitable direct-current source from whence a potential of the order of 500 volts is derived. The positive potential at lead PC is applied by way of a 470,000 ohm resistor R21 to anode A. The value of resistors R22, R23, R25, and R26 is 100,000 ohms, 47,000 ohms, 470,000 ohms, and 82,000 ohms respectively. C21 has a capacitance of 0.1 microfarad, and the voltage of battery BYA is substantially 24 volts. Leads L5 and L6 are connected to a source of alternating current with a root-mean-square value of 60 volts.

With leads PC and ZC connected to the direct-current source a discharge glow is caused to invest signal cathode SC. The operation of the start key closes contacts KS4 and the negative potential at lead ZC is extended to resistor R25 and lead L6. With leads L5 and L6 connected to the described source of alternating current the potential at lead L5 will eventually become more negative than the potential at signal cathode SC, and concurrently the potential at first and second-guide cathodes GA, and GB will also become more negative than the potential at signal cathode SC. In such circumstances, as described previously, the discharge glow will move to and invest the adjoining first-guide electrode GA1, then move to and invest the adjoining second-guide electrode GB1. When the potential at lead L5 passes from a particular negative value to a more positive value the potential at first and second-guide cathodes, GA and GB, becomes less negative than the potential at third-guide cathode GC and at the instant the difference between the said cathodes reaches an effective transfer value the discharge glow will move to and invest the adjoining third-guide electrode GC1. On the discharge glow investing third-guide electrode GC1 the potential thereat becomes less negative in consequence of the voltage which is developed across resistor R25, and when the potential difference between the third-guide cathode GC and the transit cathode TC reaches the effective transfer value the discharge glow will move to and invest the adjoining transit electrode TC1.

The glow discharge remains captive on transit electrode TC1 until, on receipt of the next impulse, the potential at lead L5, and the connected first and second-guide cathodes GA and GB, again becomes sufficiently negative to cause the discharge glow to move to and invest first-guide electrode GA2 and second-guide electrode GB2 in that order. On the potential of the incoming pulse passing from the described particular negative value to a more positive value the discharge glow is caused to move from second-guide electrode GB to the adjoining third-guide electrode GC2, and on the potential at third-guide electrode GC2 becoming sufficiently less negative than the potential at transit cathode TC the discharge glow will move to and invest the adjoining transit electrode TC2. Each subsequent incoming impulse causes the discharge glow to move in the manner described from one electrode of the transit-cathode TC by way of an electrode of the first, second and third-guide cathodes GA, GB, and GC in that order to the next electrode of the said transit cathode TC.

The ninth impulse causes the discharge glow to move to and invest signal cathode SC, and the potential developed across resistor R26 is adapted to pass an output pulse by way of lead OP to a further counting stage, or to a suitable form of recording or registering device. With the glow again investing signal cathode SC subsequent impulses will cause the discharge glow or path to move to and invest each cathode electrode in turn in the manner described previously, and to pass an output pulse to further counting or recording means on receipt of each ninth impulse. Thus the described tube CTC and associated circuit arrangement, will serve to count or divide pluralities of cycles of alternating current in the scale of nine.

On the cessation of each train of alternating current impulses the potential of the first-guide and second-guide cathodes GA and GB becomes positive in consequence of the potential derived from battery BYA. Thus if a series of such impulses ceases at a moment when the negative potential derived therefrom has caused the discharge glow to invest an electrode of the said first-guide or second-guide cathode GA or GB, and before the potential of the impulse has reached the said more positive value which is needed to guide the discharge glow to an electrode of the third-guide cathode GC, the positive potential which is derived from battery BYA will cause the first-guide and second-guide cathodes GA and GB to become less negative than the third-guide cathode GC, and the discharge glow will be guided to the adjoining third-guide electrode. With the discharge glow investing an electrode of the third-guide cathode a voltage is developed across resistor R25, this causes third-guide cathode GC to become less negative than the adjoining transit or signal cathode TC or SC and the glow moves to and invests an electrode of the said cathode TC or SC.

An arrangement adapted to count or divide in the scale of ten employing a reactive circuit will now be described with reference to Fig. 6. In this arrangement a gaseous electric discharge tube CTD has first, second, and third-guide cathodes (GA, GB, and GC) each with ten electrodes GA1, GA2, . . . GA9, GA10; GB1, GB2, . . . GB9, GB10, and GC1, GC2, . . . GC9, GC10, respectively, a transit cathode (TC) with nine electrodes TC1, TC2, . . . TC9, and a single electrode signal cathode SC. The electrodes of each multi-electrode cathode are commoned together within the bulb.

With such an arrangement leads PD and ZD are connected to the positive and negative poles respectively of a suitable source of direct current from which a potential of the order of 400 volts is obtained. The positive potential at lead PD is applied by way of a 390,000 ohm resistor R31 to anode A. Associated with the first and second-guide electrodes GA1–GA10 and GB1–GB10 are resistors R32 and R33 of 68,000 ohms and 47,000 ohms resistance, and capacitors C31 and C32 of 0.1 microfarad and 200 microfarads capacitance respectively. A 47 picrofarad capacitor C33 and a 270,000 ohm resistor R35 are associated with third-guide electrodes GC1–GC10. The signal cathode SC is returned to the negative potential at ZD by way of an 82,000 ohm resistor R36. Leads L7 and L8 are connected to a source of alternating current with a root-mean-square value of 45 volts.

With leads PD and ZD connected to the described source of direct current a discharge glow invests signal cathode SC and remains thereon until the start key is operated. On the operation of the start key contacts KS5 are closed, and with leads L7 and L8 connected to the described source of alternating current the potential at lead L7 will eventually become more negative than the potential at signal cathode SC. When the potential difference between signal cathode SC and first-guide electrode GA1 reaches the effective transfer value the discharge glow will move to and invest the said electrode GA1. With the discharge glow investing first-guide electrode GA1 capacitor C32 will become charged, and cause the potential at first-guide cathode GA to become less negative than the potential at second-guide electrode GB, but still remain more negative than the potential at signal cathode SC, and the discharge glow will move to and invest the adjoining second-guide electrode GB1.

When the potential at lead L7 passes from a particular negative value to a more positive value the potential at first and second-guide cathodes GA and GB becomes less negative than the potential applied to third-guide cathode GC, and when the potential difference between second and third-guide cathodes GB and GC reaches an effective transfer value the discharge glow will move to and invest the adjoining third-guide electrode GC1. With the discharge glow investing an electrode of the third-guide cathode GC the potential thereat becomes less negative when capacitor C33 is charged, and reaches a value when the discharge glow is caused to move to and invest the adjoining more negative transit electrode TC1. Capacitor C32 discharges by way of resistor R32 during the subsequent quiescent period.

The glow discharge remains captive on transit electrode TC1 until on receipt of the negative half of the next impulse conditions for the transfer of the discharge glow again occur, and the discharge glow moves to and invests first-guide electrode GA2 and second-guide electrode GB2 in turn. On the potential of the said impulse passing to a suitable more positive potential the discharge glow is caused to move to and invest the adjoining third-guide electrode GC2 and transit electrode TC in turn. Each subsequent impulse causes the discharge glow to move in the manner described from one electrode to the next electrode of the transit cathode TC in sequence. On each such movement the discharge traverses on electrode of the first-guide, second-guide and third-guide cathodes GA, GB, and GC respectively in that order.

On receipt of the tenth impulse the discharge glow is caused to move in the manner described from transit electrode TC9 to signal cathode SC, and the potential developed across resistor R36 is adapted to pass an output pulse by way of lead OP to a further counting stage, or recording or registering means. With the glow again investing signal cathode SC each series of ten succeeding impulses will cause the discharge glow to move from, and return to, the said signal cathode SC, and to pass an output pulse to other means on receipt of each tenth impulse. Thus the described tube CTD, and associated circuit arrangement, will serve to count or divide pluralities of cycles of alternating current in the scale of ten.

The arrangement described with reference to Fig. 6 may be adapted to form a selecting device by substituting for the described discharge tube CTD a discharge tube in which each transit electrode is brought out separately to form a signal/transit electrode, such as the tube depicted and described with reference to Fig. 2. With such a tube each such signal/transit electrode is returned separately to the negative potential at lead ZD by way of an 82,000 ohm resistor individual to each signal/transit electrode. Thus by extending an output lead directly from each such electrode, an output pulse may be extended to other means when the discharge glow is caused to invest any of the said signal/transit electrodes in response to a particular plurality of incoming pulses.

Fig. 7 shows an arrangement in which the counting circuit shown and described with reference to Fig. 4 is adapted to form a selecting arrangement. The gaseous electric discharge tube CTE is similar to that described with reference to Fig. 2 and has a first-guide, second-guide, and a third-guide cathode GA, GB, and GC respectively, each with nine electrodes GA1, GA2, . . . GA8, GA9; GB1, GB2, . . . GB8, GB9, and GC1, GC2, . . . GC8, GC9. The remaining electrodes consist of nine signal/transit cathodes each with a single electrode SC1, SC2, . . . SC8, SC9.

Leads PE and ZE are connected to the positive and negative poles of a suitable 500 volt direct-current supply, and leads L9 and L10 are connected to an alternating current supply with a root-mean-square value of 50 volts. Resistors R46, R47, R48, and R49 are each of 82,000 ohms resistance. The anode A resistor R41 is of the order of 560,000 ohms resistance, whilst the value of resistors R42, R43, and R45 is 100,000 ohms, 47,000 ohms, and 470,000 ohms respectively. Capacitor C41 has a capacitance of 0.1 microfarad.

With leads PE and ZE connected to the described direct current supply the potential difference between anode A and signal/transit electrode SC9 is such as to cause current to pass between the said electrodes and a discharge glow to invest electrode SC9. The operation of the start key closes contacts KS6 and the negative potential at lead ZE is extended to each of the other signal/transit electrodes SC1, SC2, . . . SC8 and to electrodes GA1–GA9, GB1–GB9, GC1–GC9, of the guide cathodes by way of their associated resistor network. The discharge glow continues to invest signal/transit electrode SC9 until, on receipt of the negative half cycle of the first impulse at lead L9, the potential at the first-guide and second-guide cathodes GA and GB becomes more negative than the potential at signal/transit electrode SC9. The discharge glow then moves to and invests first-guide electrode GA1 and second-guide electrode GB1 in that order in the manner described previously. On the potential of the impulse passing from its maximum negative potential to a particular more positive potential the discharge glow is caused to move to and invest third-guide electrode GC1 and signal/transit electrode SC1 in that order as described previously.

The discharge glow continues to invest signal/transit electrode SC1 until on receipt of the negative half cycle of the second impulse at lead L9 the first and second-guide cathodes GA and GB again become more negative than signal/transit electrode SC1, and the discharge glow moves to and invests first-guide electrode GA2 and second-guide electrode GB2 in that order. When the potential of the second impulse reaches the said particular more positive potential the discharge glow is caused to move to and invest third-guide electrode GC2 and signal/transit electrode SC2. Each succeeding impulse in the train of impulses will cause the discharge glow to move from one signal/transit electrode SC to the next such electrode in a predetermined sequence.

Each signal/transit electrode SC1, SC2, . . . SC8, SC9 is provided with a separate output lead as indicated by leads OP1, OP2, . . . OP8, OP9. On receipt of the last impulse in a selecting train of impulses, the discharge glow is halted for an appreciable period on the selected signal/transit electrode, and a potential developed across the associated resistor R49, R48, . . . R47, or R46 is adapted to pass an output pulse to the selected lead OP1–OP9. Thus a discharge glow in such a cold-cathode tube CTE is caused to respond to each impulse in a train of impulses not exceeding nine, and to pass a pulse to a selected lead indicative of the plurality of impulses in the said train on receipt of the final impulse therein.

A further arrangement embodying my invention in which the circuit shown in Fig. 5 is adapted to form a selecting arrangement is shown in Fig. 8. A gaseous electric discharge tube CTF has, in addition to first, second and third-guide cathodes GA, GB, and GC each with ten electrodes GA1, GA2, . . . GA9, GA10; GB1, GB2, . . . GB9, GB10; and GC1, GC2, . . . GC9, GC10, respectively, ten signal/transit cathodes each with a single electrode SC1, SC2, . . . SC9, SC10.

Leads PF and ZF are connected to the positive and negative poles respectively of a suitable 500 volt direct-current supply, and leads L11 and L12 are connected to an alternating current supply with a root-mean-square value of 60 volts. Resistor R51 associated with anode A has a resistance in the region of 470,000 ohms. Resistors R56, R57, R58, and R59 are each of 82,000 ohms resistance, whilst the value of resistors R52, R53, and R55 is 100,000 ohms, 47,000 ohms, and 470,000 ohms respectively. Cacapitor C51 has a capacity of 0.1 microfarad, and the voltage of battery BYB is substantially 24 volts.

With leads PF and ZF connected to the described direct-current supply the potential difference between anode A and signal/transit electrode SC10 causes a discharge glow to invest electrode SC10. The operation of the start key closes contacts KS7 and the negative potential at lead ZF is extended to each of the other signal/transit electrodes SC1, SC2, . . . SC9, and to electrodes GA1–GA10, GB1–GB10, and GC1–GC10 of the guide cathodes by way of their associated resistor network. The discharge glow continues to invest signal/transit electrode SC10 until, on receipt of the negative half cycle of the first impulse at lead L11, the potential at first and second-guide cathodes GA and GB becomes more negative than the potential at signal-transit electrode SC10. The discharge glow then moves to and invests first-guide electrode GA1 and second-guide electrode GB1 in that order. On the potential of the impulse passing from its maximum negative potential to a particular more positive potential the discharge glow is caused to move to and invest third-guide cathode GC1 and signal/transit electrode SC1 in that order.

The discharge glow continues to invest signal/transit electrode SC1 until on receipt of the negative half cycle of the second impulse at lead L9 the first and second-guide cathodes GA and GB again become more negative than signal/transit electrode SC1, and the discharge glow moves to and invests first-guide electrode GA2 and second-guide electrode GB2 in that order. When the potential of the second impulse reaches the said particular more positive potential the discharge glow is caused to move to and invest third-guide electrode GC2, and signal/transit electrode SC2 in that order. Each succeeding impulse in the train of impulses will cause the discharge glow to move from one signal/transit electrode SC to the next such electrode in a predetermined sequence.

Each signal/transit electrode SC1, SC2, . . . SC9, SC10 is provided with a separate output lead as indicated by leads OP1, OP2, . . . OP9, OP10. On receipt of the last impulse in a selecting train of impulses the discharge glow is halted for an appreciable period on the selected signal/transit electrode, and a potential developed across the associated resistor R59, R58, . . . R57, R56 is adapted to pass an output pulse to the selected lead OP1 . . . OP10. When the selecting train of impulses ceases the potential at the first-guide and second-guide cathodes GA and GB becomes positive in consequence of the potential derived from battery BYA. Thus if the series of impulses cease during the negative half cycle of an impulse, before the final impulse has reached the said particular more positive potential which is needed to guide the discharge to a third-guide electrode, the positive potential of first-guide and second-guide cathodes GA and GB which is derived from battery BYB will cause the said first and second-guide cathodes to become less negative than third-guide cathode GC, and the discharge glow will be guided to the adjoining third-guide electrode. With the discharge glow investing a third-guide electrode a voltage is developed across resistor R55, this causes third-guide cathode GC to become less negative than the adjoining signal/transit electrode, and the discharge glow will move to and invest the said adjoining signal/transit electrode.

Thus a discharge glow in such a cold-cathode tube CTF is caused to respond to each impulse in a train of impulses not exceeding ten, and to pass a pulse to a selected lead indicative of a plurality of impulses in the said train on receipt of the final impulse therein.

Although each of the arrangements embodying my invention has been described with reference to incoming pulses of alternating current my invention is not confined to such pulses, or to pulses of any particular waveform. In other arrangements impulses of pulsating direct current may be employed with a bias battery connected in a similar manner to the arrangements described with reference to Fig. 5 and Fig. 8. It is a feature of my invention that it is not restricted to incoming pulses of any particular wave form and will function satisfactorily with sine wave, rectangular, or triangular wave shapes.

It will be appreciated that although I have described my invention with reference to two preferred forms of discharge tube my invention is not confined to tubes of such dimensions or characteristics, and in other forms of discharge tube embodying my invention I may include other pluralities of first-guide, second-guide, third-guide, transit and signal electrodes. In other forms of tube I may modify the gaseous mixture, and/or pressure, or the electrode spacings and/or materials in order to obtain the required operating characteristics.

Each of the arrangements described with reference to Figs. 3 to 8 inclusive is such that an output pulse is developed and passed to other means on the completion of a cycle of movements of the discharge glow. My invention, however, is not restricted to such counting or selecting arrangements and in another counting arrangement the output lead and associated resistor may be dispensed with, and with the discharge glow made visible the position of the glow may be used to determine the number of impulses which the discharge device has received. Such an arrangement is limited by the plurality of impulses which complete the cyclic movements of the discharge glow within the device.

In other arrangements the output pulse derived from the described arrangements may be adapted to move the discharge glow in a similar type of discharge device. By such means a small number of discharge devices may be arranged to count large pluralities of impulses, and provide a visual indication of the counted impulses by means of the positions of the visual glow in each such device.

It is recognised that with gaseous discharge devices of the type described with reference to Figs. 1 and 2 the transfer of the glow is not an instantaneous event, and that there may be some division of the glow between the invested discharge point and the adjoining discharge point but with the stated potentials and values of the arrangements described with reference to Figs. 3, 4, 5, 6, 7, and 8 the discharge glow may be considered to invest one discharge point only at a given time. In the arrangements described with reference to Figs. 3 to 8 inclusive it should be noted that the movement of the discharge path from each discharge point to an adjoining discharge point is effected without extinction of the glow, and that the discharge path is thereby maintained without interruption throughout the period the device is energised.

In each of the tubes described with reference to Figs. 1 and 2 the discharge points of the cathode electrodes have been numbered in a clockwise direction, and in such tubes the movement of the discharge glow in the arrangements described with reference to Figs. 3 to 8, would be in a clockwise direction as seen from the top of the bulb, but it should be noted that the construction and operation of the described discharge tubes and the associated arrangements is such that the glow or discharge path can be readily moved in an anti-clockwise direction as in the described clockwise direction. When the connections to the first and third-guide electrodes are reversed the functions of the said electrodes are transposed, and the discharge path will move in an anti-clockwise direction as seen from the top of the tube.

It is a feature of my invention that arrangements including resistive means of guiding the discharge glow, as described with reference to Figs. 3, 4, 5, 7, and 8, permit a greater tolerance with respect to the wave shape and speed of the incoming pulses than arrangements including reactive means for such a purpose, such as that described with reference to Fig. 6.

In addition to the particular form of discharge tube described with reference to Figs. 1 and 2, and the arrangements thereof described with reference to Figs. 3 to 8 inclusive, many other forms of such a discharge device and arrangements will become obvious to those skilled in the art after the principles herein described are understood. For example the anode may take the form of a hollow cylinder and be arranged within or without the ring of cathode discharge points, or the polarity of the constituent electrodes may be transposed and the discharge point electrodes form anodes, the common electrode form a cathode, and the glow be guided around the periphery of the cathode.

I claim:

1. A cold cathode gaseous discharge device comprising a gas filled envelope, an electrode mounting therein, a plurality of electrodes carried by said mounting, a common electrode carried by said mounting and spaced from said plurality of electrodes to provide a succession of discharge gaps between said common electrode and said plurality of electrodes, said plurality of electrodes being arranged in at least four categories with each electrode of each category interposed in the same sequence between electrodes of other categories, means within the envelope connecting together all the electrodes of one category and connections extending through the envelope whereby said plurality of electrodes and said common electrode may be connected to sources of electrical potential.

2. A cold cathode gaseous discharge device comprising an envelope, a common electrode mounted therein, at least four sets of other electrodes also mounted within the envelope and spaced from said common electrode to provide between them and said common electrode a succession of discharge gaps spaced apart around a closed path, said sets of electrodes being so arranged that a plurality of groups of electrodes are provided in sequence with each group comprising one electrode from each set arranged in regular sequence, means within the envelope connecting together the electrodes in one set and connections extending through the envelope whereby the said common electrode and the said sets of electrodes may be connected to sources of electrical potential.

3. A gaseous electrical discharge device of the cold cathode type adapted to count in response to electrical impulses comprising a gas filled envelope, a common electrode mounted therein and presenting a discharge surface, at least four sets of other electrodes mounted within said envelope and spaced from said discharge surface in succession along a closed path to present a plurality of discharge gaps between them and the said common electrode at spaced intervals along said path the said sets of electrodes being so arranged that between adjacent electrodes of one set there are interposed in regular succession three electrodes one from each of the remaining three sets, commoning connections for the electrodes in each of three sets and means extending through the envelope whereby the said common electrode and the said sets of electrodes may be connected respectively to sources of electrical potential.

4. A gaseous electrical discharge device of the cold cathode type adapted to register electrical impulses comprising a gas filled envelope, a common electrode mounted therein, at least four sets of other electrodes mounted within said envelope and spaced at equal distances from said common electrode in succession along a closed path and also spaced uniformly from one another along said path to present a plurality of uniformly spaced discharge gaps of substantially the same characteristics, the said sets of other electrodes being so arranged that between at least all except one pair of adjacent electrodes of one set there are interposed in regular sequence three electrodes, one from each of the remaining three sets, commoning connections for the electrodes in each of said remaining three sets and means extending through the envelope whereby the said common electrode and the said sets of other electrodes may be connected respectively to sources of electrical potential.

5. A gaseous electrical discharge device of the cold cathode type adapted to register electrical impulses comprising a gas filled envelope, a common electrode mounted therein, a set of signal/transit electrodes also mounted in said envelope and spaced from said common electrode to present between them and said common electrode discharge gaps spaced uniformly around a closed path, at least three sets of guide electrodes also mounted in said envelope and similarly spaced from said common electrode each such set of guide electrodes having the same number of electrodes as the signal/transit electrodes and having one electrode from each set interposed between successive pairs of signal/transit electrodes in regular sequence, commoning connections for each set of guide electrodes, and means extending through the envelope whereby the said common electrode, signal/transit electrodes and guide electrodes may be connected respectively to sources of electrical potential.

6. In a gaseous electrical discharge device of the cold cathode type, an electrode assembly comprising a common electrode, a plurality of other electrodes spaced from said common electrode and from one another to provide a succession of discharge gaps between them and said common electrode, said plurality of electrodes comprising at least four sets of electrodes so arranged that each electrode of each set is interposed in the same sequence between electrodes of other sets, commoning connections connecting together in separate sets all of the electrodes in each of at least two of said sets and supporting means carrying said common electrode and said other electrodes.

7. In a gaseous electric discharge device of the cold cathode type, an electrode assembly comprising a support, a common electrode mounted on said support, a plurality of other electrodes mounted on said support so as to be spaced substantially equally from said common electrode and substantially uniformly from one another to provide a succession of discharge gaps of substantially the same characteristics between them and said common electrode which gaps are arranged along a closed path, said plurality of electrodes comprising at least four groups of electrodes so arranged that each electrode of each group is interposed in the same sequence between electrodes of other groups and connections commoning in sets all of the electrodes in two of said sets and at least some of the electrodes in a third set.

8. In a gaseous electric discharge device of the cold cathode type, an electrode assembly comprising a support, a common electrode carried by said support, a plurality of other electrodes, also carried by said support and spaced uniformly from said common electrode and at regular intervals from one another to provide between them and said common electrode a succession of discharge gaps arranged at regular intervals along a closed circuit, said plurality of other electrodes comprising one set of signal/transit electrodes and three sets of guide electrodes so arranged that between at least all except one adjacent pair of signal/transit electrodes there are arranged in regular sequence three guide electrodes belonging one to each set thereof and separate commoning means connecting together in their respective sets guide electrodes of the three sets.

9. An electrical circuit arrangement comprising an electric discharge device as claimed in claim 2, means for applying across the common electrode and one of said other electrodes other than an electrode in a connected set a potential sufficient to initiate a glow discharge, impedances connected respectively between the next succeeding pair and between the subsequent pair of electrodes following that at which the glow is initiated, means for extending the glow initiating potential at will to the electrodes other than that at which the glow is initiated and means for applying electrical impulses to be registered to the electrode next following that at which the glow is initiated and through the impedance connecting such electrode to its succeeding electrode.

10. An electrical circuit arrangement for registering a succession of electric impulses comprising an electric discharge device of the cold cathode type according to claim 5, means for applying a potential across the common electrode and one of the said signal/transit electrodes to initiate a glow discharge thereat, switch means for extending said potential to the remaining electrodes of the discharge tube, impedances connected respectively between the first and second sets of guide electrodes and between the third set of guide electrodes and at least all except one of the remainder of said signal/transit electrodes and means for applying electrical impulses to be registered to the second set of guide electrodes.

11. An electrical circuit arrangement for counting a succession of electrical impulses comprising an electric discharge device as claimed in claim 5, means for applying across the common electrode and one of the signal/transit electrodes a potential sufficient to initiate a glow discharge thereat, means commoning the remainder of said signal/transit electrodes, switch means for extending said potential to the said remainder of said signal/transit electrodes and said guide electrodes, resistances connected respectively between the first and second sets of guide electrodes and between the third set of guide electrodes and the commoned signal/transit electrodes and means interposed in circuit common to the second set of guide electrodes and to the resistance connected between the first and second sets of guide electrodes for applying a succession of electrical impulses to be counted.

12. An electrical circuit arrangement for selecting in accordance with a succession of electrical impulses comprising an electric discharge device as claimed in claim 5, means for applying across the common electrode and one of the signal/transit electrodes a potential sufficient to initiate a glow discharge thereat, switch means for extending said potential to the remaining electrodes of the discharge tube resistances connected individually between the remaining signal/transit electrodes respectively and said switch means, resistances connected respectively between said first and second sets of guide electrodes and between the third set of guide electrodes and the common connection of the switch means with the resistances of the signal/transit electrodes and means for applying a succession of electrical impulses in circuit with the first and second guide electrodes at the connection between the second guide electrodes and the resistances connected between them and the first guide electrodes.

JOHN REGINALD ACTON.

References Cited in the file of this patent

UNITED STATES PATENTS

| Number | Name | Date |
|---|---|---|
| 2,473,159 | Lyman | June 14, 1949 |
| 2,517,599 | Reeves | Aug. 8, 1950 |
| 2,553,585 | Hough | May 22, 1951 |